United States Patent
Jonsson et al.

(10) Patent No.: US 9,465,276 B2
(45) Date of Patent: Oct. 11, 2016

(54) WEBCAM PRIVACY SHIELD

(71) Applicants: Karl S Jonsson, Rancho Santa Margarita, CA (US); Sigurbjorg Hlin Bergthorsdottir, Rancho Santa Margarita, CA (US)

(72) Inventors: Karl S Jonsson, Rancho Santa Margarita, CA (US); Sigurbjorg Hlin Bergthorsdottir, Rancho Santa Margarita, CA (US)

( * ) Notice: Subject to any disclaimer, the term of this patent is extended or adjusted under 35 U.S.C. 154(b) by 370 days.

(21) Appl. No.: 14/256,954

(22) Filed: Apr. 19, 2014

(65) Prior Publication Data

US 2015/0009399 A1 Jan. 8, 2015

Related U.S. Application Data

(60) Provisional application No. 61/843,338, filed on Jul. 6, 2013.

(51) Int. Cl.
*G03B 11/04* (2006.01)
*G06F 1/16* (2006.01)

(52) U.S. Cl.
CPC .......... *G03B 11/041* (2013.01); *G06F 1/1656* (2013.01); *G06F 1/1686* (2013.01)

(58) Field of Classification Search
CPC ... G03B 11/04; G03B 11/041; G03B 11/043; G03B 11/045
USPC ....................................................... 396/448
See application file for complete search history.

(56) References Cited

U.S. PATENT DOCUMENTS 5,503,891 A * 4/1996 Marshall ................ B32B 27/18
  40/600
5,994,990 A * 11/1999 Ogikubo .................. G09B 9/14
  335/285

(Continued)

FOREIGN PATENT DOCUMENTS

CN  201968420 U  *  9/2011 ............. A47G 29/00
CN  203606742 U  *  5/2014

(Continued)

OTHER PUBLICATIONS

"Undercover Private iSight Webcam"; Jul. 24, 2012; Vintuitive. com; <http://www.vintuitive.com/undercover-private-isight-webcam/>.*

*Primary Examiner* — John Villecco
(74) *Attorney, Agent, or Firm* — Young's Patent Services, LLC; Bruce A. Young

(57) ABSTRACT

A webcam privacy shield is magnetically attached to a bezel of an electronic display that includes a webcam. The webcam privacy shield is positioned in either a shielded position where light is blocked from entering the lens of the webcam by positioning an opaque portion of the webcam privacy shield over the lens of the webcam, or an operating position where light is allowed to enter the lens of the webcam by positioning a transparent portion of the webcam privacy shield of the lens of the webcam. Sliding the webcam privacy shield between the shielded position and the operating position allows the user to selectively maintain their privacy from the webcam, or use the webcam.

19 Claims, 6 Drawing Sheets

(56) References Cited

U.S. PATENT DOCUMENTS

| | | | |
|---|---|---|---|
| 7,239,806 B2 | 7/2007 | Chen | |
| 7,338,573 B2 * | 3/2008 | Boudouris | B32B 27/18 156/244.11 |
| 7,486,165 B2 * | 2/2009 | Ligtenberg | G06F 1/1616 335/205 |
| 7,568,848 B2 | 8/2009 | Ho | |
| 7,581,893 B2 * | 9/2009 | Miramontes | H04M 1/0264 396/448 |
| D643,457 S | 8/2011 | Delong | |
| 8,242,924 B2 * | 8/2012 | Huang | G06F 1/1616 340/545.6 |
| D669,112 S | 10/2012 | Gustaveson | |
| 8,471,956 B2 * | 6/2013 | Fortmann | G06F 1/1613 348/373 |
| 8,724,020 B1 | 5/2014 | Haddad | H04N 5/2254 348/375 |
| D708,657 S * | 7/2014 | Gustaveson | D16/250 |
| 9,305,538 B2 * | 4/2016 | Tyson | G10K 11/16 |
| 2002/0160231 A1 * | 10/2002 | Schneider | G11B 5/70 428/843 |
| 2003/0008096 A1 * | 1/2003 | Benitz | B32B 3/10 428/44 |
| 2007/0269202 A1 * | 11/2007 | Forsyth-Martinez | G03B 11/00 396/429 |
| 2008/0151400 A1 | 6/2008 | Gonzalvo | |
| 2008/0305283 A1 * | 12/2008 | Denet | B60R 11/00 428/31 |
| 2011/0058255 A1 * | 3/2011 | Weiss | H04M 1/0264 359/511 |
| 2011/0090630 A1 * | 4/2011 | Bergeron | G06F 1/1616 361/679.26 |
| 2012/0301132 A1 * | 11/2012 | Mitskog | B32B 7/12 396/448 |
| 2013/0235462 A1 * | 9/2013 | Haas | G02B 5/003 359/614 |
| 2014/0198439 A1 * | 7/2014 | De Pietro | G06F 1/1686 361/679.02 |
| 2014/0220269 A1 * | 8/2014 | Ogufere Ogufere | B44C 5/005 428/34.1 |
| 2015/0059251 A1 * | 3/2015 | Rinner | G06F 1/1656 49/465 |
| 2015/0215535 A1 * | 7/2015 | Takahashi | G03B 11/04 348/375 |
| 2016/0161830 A1 * | 6/2016 | Gonzalez Sanchez | G06F 1/1686 396/448 |

FOREIGN PATENT DOCUMENTS

| | | | | |
|---|---|---|---|---|
| CN | 203870370 U | * | 10/2014 | |
| CN | 204496352 U | * | 7/2015 | |
| DE | 202011106305 U1 | * | 1/2012 | ........... H04N 5/2254 |
| DE | 202013005345 U1 | * | 10/2013 | ........... H04N 5/2251 |
| WO | 2009137600 A | | 11/2009 | |

* cited by examiner

WEBCAM PRIVACY SHIELD

CROSS-REFERENCE TO RELATED APPLICATIONS

The present application claims benefit under 35 U.S.C. §119(e) to U.S. Provisional Application No. 61/843,338 filed on Jul. 6, 2013 the entire contents of which are hereby incorporated by reference for any and all purposes.

BACKGROUND

1. Technical Field

The present subject matter relates to computer webcams. More specifically, it relates to a privacy shield for a webcam.

2. Description of Related Art

Over the last 10-15 years, webcams have become an increasingly popular peripheral for personal computers. At first, webcams were stand-alone devices with an analog video connection to the computer, but gradually, a USB interface became the defacto standard for the interface to a stand-alone webcam. A common usage model was to plug the webcam into the computer if an application that would use the webcam was going to be used, such as a video chat application. Once the user was done with using the application, the webcam could be unplugged and put away. Some webcams included a privacy shield, such as a mechanical shutter, that allowed the lens to be covered if the user wanted to block the view from the webcam for privacy reasons.

Various types of malware have also become increasingly common over the last 10-15 years. Malware may take many forms, including, but not limited to, computer viruses, Trojan horse software, spyware, ad-ware, or misbehaving applications. In some cases, malware has been designed to hijack a webcam and send video from the webcam to another computer over a network, which might be in the next room, across the country, or anywhere in the world, if the webcam is coupled to an internet connected device.

Recently, webcams have become nearly standard equipment on notebook computers, as well as tablets and smartphones. Most webcams on notebook computers, tablets, and smartphones do not include a privacy shield. This may be due to market demands for thin form factors or other reasons. If no privacy shield is included, malware may be able to hijack the webcam without the user's permission or knowledge, which may allow the malware to spy on the user, invading their privacy. Still and/or video images acquired by the malware may be embarrassing, or even dangerous, to the user. In some cases, images from the malware have been posted to social media sites, embarrassing the subject of the images and leading to potential damage to the subject's social and business relationships. Criminals may even attempt to use such images to blackmail the subject. Users of traditional webcams can avert hijacking of the webcam by simply unplugging the webcam, but if the webcam is built into the device, and the device needs to be left on for some reason, this is not possible. This leaves people that may engage in activities that they wish to keep private vulnerable to malware which may hijack the webcam of a nearby device.

BRIEF DESCRIPTION OF THE DRAWINGS

The accompanying drawings, which are incorporated in and constitute part of the specification, illustrate various embodiments. Together with the general description, the drawings serve to explain the principles of the invention. They should not, however, be taken to limit the invention to the specific embodiment(s) described, but are for explanation and understanding only. In the drawings.

DETAILED DESCRIPTION

Figure 1A:
FIG. 1A is a drawing of a first embodiment of a webcam privacy shield.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Magnetic material is a material that may be attracted to a magnet. Magnetic material may or may not remain magnetized without an external magnetic field. Examples of magnetic material include a magnet, steel, or other ferromagnetic materials.

A magnet is a magnetic material that generates a magnetic field, or is magnetized, even if the magnet is not being subjected to an external magnetic field. A magnet may also be referred to as a permanent magnet.

Ferromagnetic material, for the purposes of this disclosure, including the claims, refers to a magnetic material that does not generate a significant magnetic field of its own, or is not magnetized, without the presence of an external magnetic field. Ferromagnetic materials are attracted to a magnet. Ferromagnetic materials may include iron, nickel, cobalt, and many of their alloys, such as many steel alloys, as well as some compounds of rare earth metals. For the purposes of this disclosure, ferromagnetic materials include ferrimagnetic materials that are attracted to a magnet.

A webcam is a camera capable of taking still images, video images, or both, that is coupled to a computer. For the purposes of this disclosure, including the claims, the words camera, and webcam may be considered to be synonyms. Any type of camera may be a webcam, including, but not limited to a video camera, a still camera, a cell phone camera, a mobile device camera including, but not limited to, a backward facing camera, a thermal imager, a CCD device, a three-dimensional camera, or any other type of image capture apparatus that may allow the capture of image data and provide it to an electronic system. In some embodiments, a webcam may be integrated into an electronic system, such as, but not limited to, a notebook computer, a tablet, a smart phone, or a separate electronic display.

Many electronic systems now include an integrated camera, such as a webcam. While in the past, it was common for webcams to include a mechanical shutter to allow a user to block light from entering the lens, many modern systems do not include a mechanical shutter on their integrated webcams. This may create a risk, or at least a perceived risk, of a lack of privacy, especially given highly publicized incidents where a webcam has been used to spy on an individual. The rise of various types of malware have increased the need to be able to mechanically shield a webcam in such a way that it cannot be overridden by malware and where it is easy to verify that the webcam is indeed shielded and not able to capture any images of its surroundings.

Some electronic systems that include an integrated webcam also include magnets in the same general proximity of the webcam, such as in the bezel of a display. The magnets may be included for a variety of reasons, such as to provide a force to keep a notebook computer closed, to detect if a lid of a notebook computer has been closed, or to detect if a cover has been placed over the display. The inventors realized that these same magnets may also be used to hold a webcam privacy shield in position on the bezel of the display. The webcam privacy shield may be designed to make it obvious to the user whether or not the webcam is shielded, or whether the webcam is operable and able to capture images of the surrounding environment.

In embodiments, the webcam privacy shield is a thin, elongate, member with a hole, or transparent portion, that can be positioned over the lens of the webcam by the user to allow the webcam to operate normally. If the user wished to shield the webcam, the webcam privacy shield may simply be slid to one side, covering the lens of the webcam with an opaque portion of the webcam privacy shield. A user can then easily tell whether or not the webcam has been blocked by glancing at the computer and seeing whether the lens of the webcam is visible. To use the webcam again, the user simply slides the webcam privacy shield to position the hole, or transparent portion, over the lens of the webcam again.

Because the location of magnets may vary between different electronic systems, the configuration and exact dimensions of the webcam privacy shield may be different for different systems. By locating magnetic material of the webcam privacy shield at specific locations with respect to opaque portions and transparent portions of the webcam privacy shield, the webcam privacy shield may be held in place by the magnets in the electronic system in either a shielded position or an operating position. In some cases, however, a webcam privacy shield may be designed to accommodate multiple models of electronic systems. For example, in at least one popular family of notebook computers, the Apple® MacBook® line of computer, including many models of the MacBook Air® and MacBook Pro®, four magnets are integrated into the top bezel of the display that forms the lid of the notebook computer. These models also integrate a webcam into the top bezel of the display. The locations of the four magnets with respect to the webcam are substantially the same across several different models, or at least close enough to being the same that a single version of the webcam privacy shield may be used across most, if not all, models of the MacBook product line.

The webcam privacy shield may be constructed using any type of material as its base material, although some embodiments may be constructed from a sheet of ferromagnetic material, and others may be constructed using a plastic base material with some magnetic material embedded in, or attached to, the plastic base material. A transparent portion of the webcam privacy shield may be a hole in the base material, or may be formed from a piece of transparent material. Some embodiments of the webcam privacy shield may also include non-scratch material on the back side of the webcam privacy shield, to minimize scratching of the bezel as the webcam privacy shield is slid on the surface of the bezel. In some embodiments, the non-scratch material may also reduce friction as the webcam privacy shield is slid.

Many different types of ferromagnetic material may be used for various embodiments. Some embodiments may use steel that is 0.05 millimeter (mm), 0.20 mm, 0.25 mm, 0.004 inch (") (or 0.102 mm), 0.005" (0.127 mm), 0.006" (0.152 mm), 0.007" (0.178 mm), or 0.008" (0.203 mm) thick. Some embodiments may use a cold rolled steel. Other embodiments may use 400 series stainless steel, such as 410, 416, 420, 520, Or 440C stainless steel. Some embodiments may choose a ferromagnetic material having a hardness of Rockwell C48 or higher. In at least one embodiment, blue-finished and polished 1095 spring steel may be used. Other embodiments may use low carbon steel shim stock, general purpose low-carbon steel foil, or economy grade 430 stainless steel foil.

The webcam privacy shield may be thin enough to allow a notebook computer to be closed with the webcam privacy shield in place. The webcam privacy shield may be compatible with other accessories commonly used on a notebook computer, such as a 3M™ Privacy Filter. The webcam privacy shield may magnetically attach to the bezel over the top of the Privacy Filter, as the Privacy Filter does not block the magnetic fields. The webcam privacy shield may be thin enough to allow a notebook computer to be closed with both the Privacy Filter and the webcam privacy shield in place.

The webcam privacy shield may be made in any color to match the design of the electronic device or to appeal to a user. Example colors may include black, white, or silver to match the color of a bezel of a target electronic display, or blue, pink, red, green, or other popular color. The webcam privacy shield may also be used for advertising or promotion and have an advertisement, company logo, or other promotional information printed, engraved, or otherwise attached to the visible side of the webcam privacy shield. The webcam privacy shield may then be used as a promotional item, perhaps even be distributed at no cost to a user, to promote the product, service, or company shown on the front.

Reference now is made in detail to the examples illustrated in the accompanying drawings and discussed below.

FIG. 1A is a drawing of a first embodiment of a webcam privacy shield 120. The 1$^{st}$ webcam privacy shield 120 may be useable for some models of an Apple MacBook Pro notebook computer, and may be usable for other electronic systems as well. The 1$^{st}$ webcam privacy shield 120 may be cut from a thin sheet of opaque magnetic material, which may be a ferromagnetic material, forming a thin, elongate, member, or strip of ferromagnetic material. Thin, as used herein and tin the claims, may be defined relative to the width of the strip. Material may be referred to as thin if the thickness is less than about 20% of the width of the strip. Various portions of the strip of ferromagnetic material may act as an opaque portion of the thin, elongate, member, and a magnetic portion of the thin, elongate, member. In various embodiments similar to the 1$^{st}$ webcam privacy shield 120, the ferromagnetic material may be no more than 1 mm thick, and may be steel between 0.05 mm and 0.30 mm thick in some embodiments. In at least some embodiments, the steel may be stainless steel or spring steel that is between 0.10 mm and 0.25 mm.

The 1$^{st}$ webcam privacy shield 120 may be formed as a thin, elongate, member having a total length of about 250 mm and a constant width of about 10 mm. The ends may have radiused corners with a radius of about 5 mm, although other embodiments may use different radii. Other similar embodiments may have different lengths and widths, with the width varying along the length in some embodiments. Some embodiments may have a length that does not exceed 400 mm with a width that does not exceed 40 mm. Some embodiments may have a length between 180 mm and 300 mm with a width between 8 and 20 mm, while some embodiments may have a length between 230 mm and 280 mm with a width between 9 and 15 mm.

The 1$^{st}$ webcam privacy shield 120 includes a hole 122 cut through the thin, elongate, member, or strip, to create a transparent portion. The size and position of the hole 122 may vary between embodiments, but the hole 122 of the 1$^{st}$ webcam privacy shield 120 is about 16 mm long and about 7 mm wide with radiused corners and centered in the width of the thin, elongate member. The hole 122 may not be centered in the length of the 1$^{st}$ webcam privacy shield in at least some embodiments, with one edge of the hole 122 located about 110 mm from one end of the thin, elongate, member, and the opposite edge of the hole 122 located about 124 mm from the opposite end of the thin elongate member. In various embodiments, the hole may be at least about 10 square millimeters (mm$^2$) in size and may be located no closer than about 70 mm from either end of the thin, elongate, member. The hole may have any shape, but may be a circle, an oval, an ellipse, a rectangle, or a rectangle with radiused corners in some embodiments. In some embodiments, the hole may be between 5 mm and 15 mm wide and between 5 mm and 25 mm long, and in some embodiments, the hole may be between 10 mm and 20 mm long, with a width that is at least 6 mm but no wider than 2 mm less than the maximum width of the thin, elongate member, to leave at least 1 mm of material on either side of the hole. In some embodiments, an edge of the hole may be located at least 80 mm from a first end of the thin, elongate, member, and an opposite end of the hole may be located at least 90 mm from an opposite end of the thin, elongate, member, but in some embodiments, the hole may be located no closer than 100 mm from either end of the thin, elongate, member.

Figure 1B:
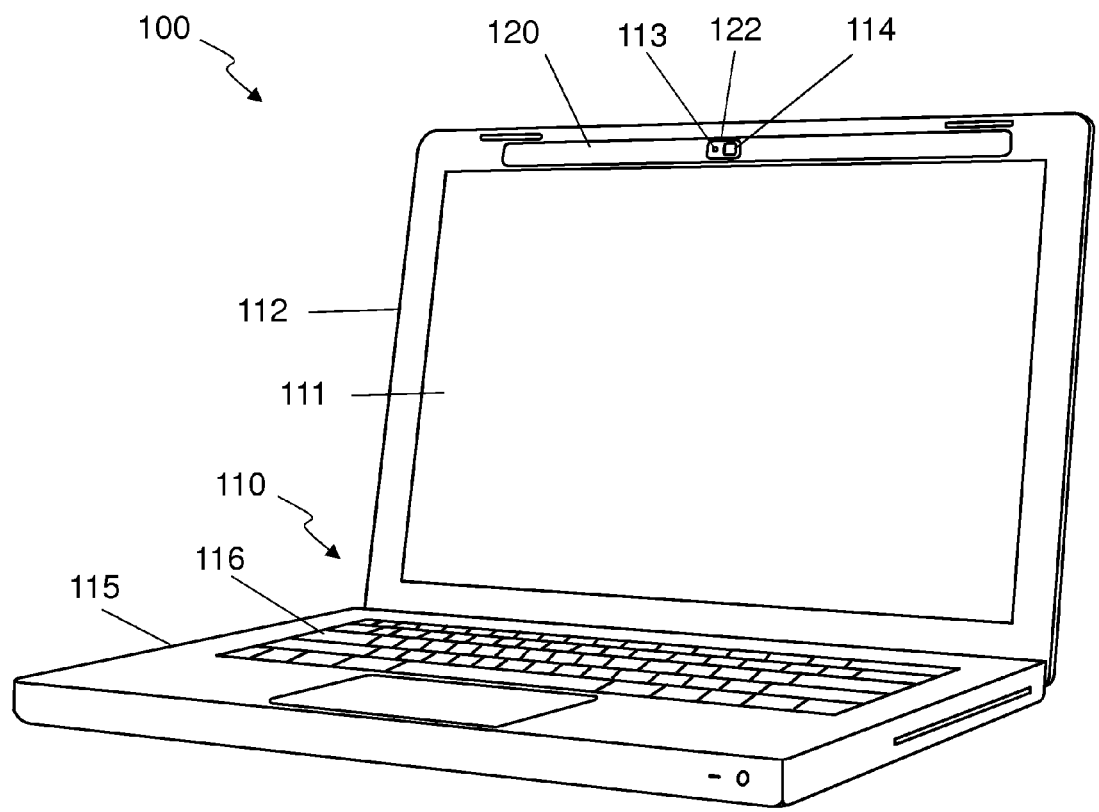
FIGS. 1B and 1C depict an electronic system with the first embodiment of a webcam privacy shield in an unshielded and shielded position, respectively.
Figure 1C:
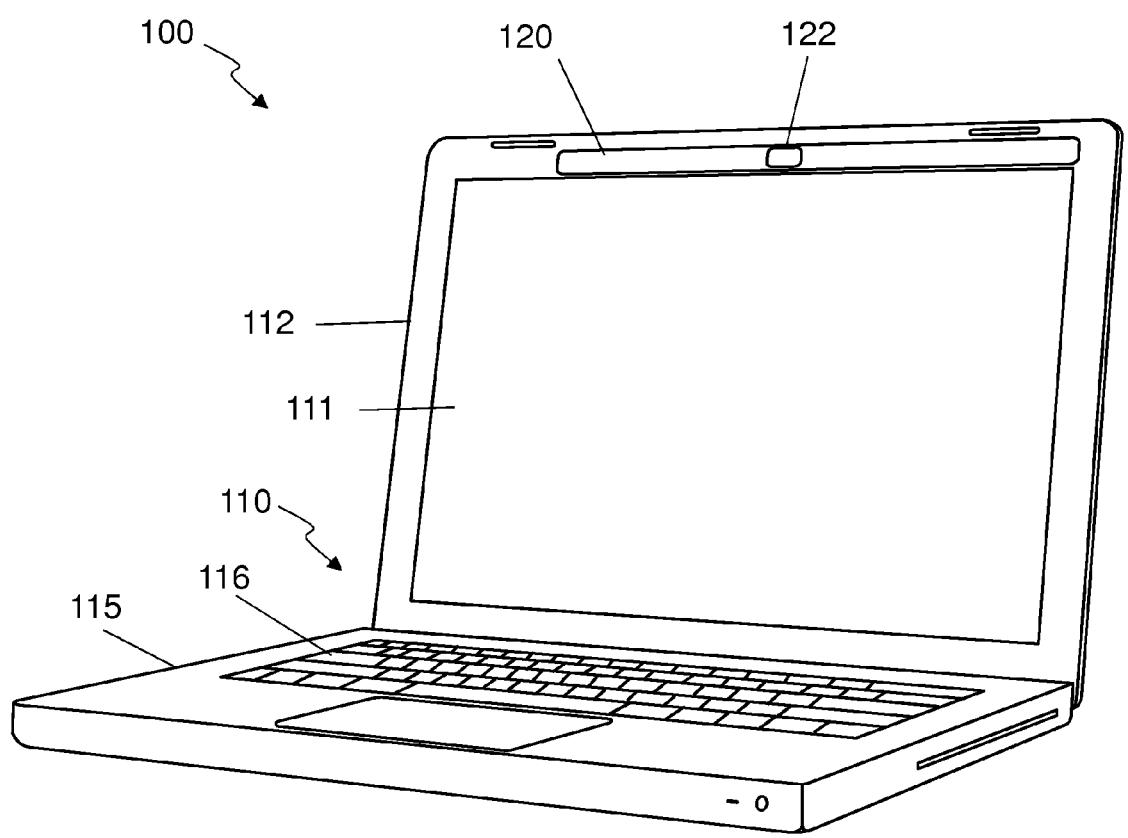

FIGS. 1B and 1C depict an electronic system 100 with a first embodiment of a webcam privacy shield 120 in an unshielded and shielded position, respectively. The electronic system 100 includes a notebook computer 110. Other embodiments may be suited for use on other types of electronic systems, such as a stand-alone electronic display, a tablet, or a smart phone. The notebook computer 110 includes an electronic display 111 with a bezel 112. A light emitting diode (LED) 113 may be included in some electronic systems next to a webcam 114 that is integrated into the bezel 112. The LED 113 may be used as an illumination source and/or as an activity indicator, depending on the electronic system. At least one magnetic area may be integrated into the bezel 112 of the electronic display 111. The magnetic areas may be one or more permanent magnets embedded into the bezel 112, and/or ferromagnetic material used to construct the bezel 112, embedded in the bezel 112, or attached to the bezel 112.

The webcam privacy shield 120 may be magnetically attached to the bezel 112. The webcam privacy shield 120 may be constructed as a thin, elongate, member with a magnetic portion, and an opaque portion. The webcam privacy shield 120 may be positioned in an operating position as shown in FIG. 1B, or in a shielded position as shown in FIG. 1C. If the webcam privacy shield 120 is positioned in the operating position, a hole 122 may be positioned to expose the lens of the webcam 114 and to allow the webcam 114 to receive light and capture images of its surrounding environment. The LED 113 may also be exposed through the hole 122 if the webcam privacy shield 120 is in the operating position. If the webcam privacy shield 120 is positioned in the shielded position, an opaque portion of the webcam privacy shield 120 may be positioned to cover the lens of the webcam 114 and to block light from entering the lens of the webcam 114, thereby protecting the visual privacy of any individuals in the surrounding area. The LED 113 may also be covered by the opaque portion of the webcam privacy shield 120 if the webcam privacy shield 120 is in the shielded position. The webcam privacy shield 120 may be held in either the operating position or the shielded position by a magnetic attraction between the at least one magnetic area of the bezel and the magnetic portion of the thin elongate member.

The notebook computer 110 also includes a base unit 115 with a keyboard 116. The base unit 115 may include a processor and memory, although some embodiments may include the processor and memory behind the display 111. The electronic display 111 is hingedly coupled to the base unit 115 to fold over the keyboard 116. The thin, elongate, member is thin enough to allow the electronic display 111 to fully close over the keyboard 116 with the thin, elongate, member in the either shielded or operating position. If a latching mechanism is included in the notebook computer, the electronic display 111 is deemed to be fully closed if the latching mechanism is able to hold the electronic display 111 folded over the keyboard 116. Latching mechanism is intended broadly, and may be a mechanical latch, an electric-mechanical latch, a magnetic force, spring tension, or friction in the hinge, among other latching mechanisms.

Figure 2A:
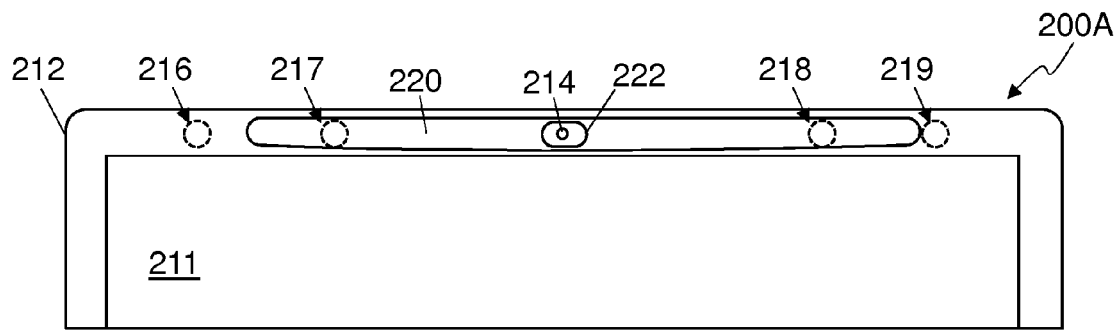
FIGS. 2A and 2B depict a second embodiment of a webcam privacy shield in positions to respectively uncover and cover a webcam on a bezel of an electronic display.
Figure 2B:
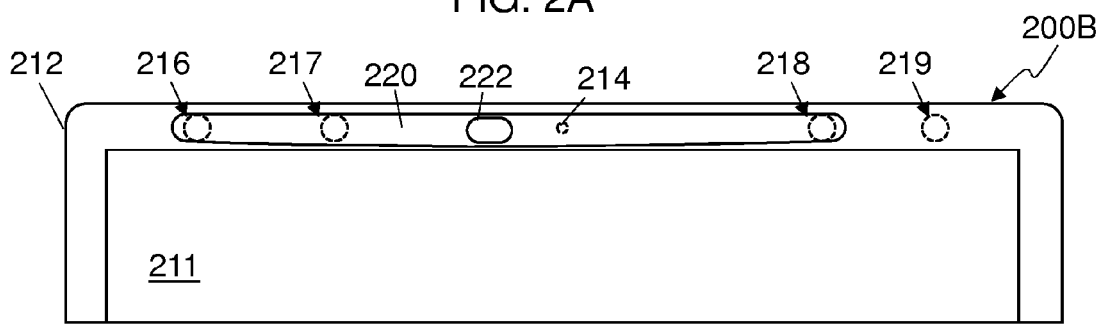

FIGS. 2A and 2B depict a second embodiment of a webcam privacy shield 220 in positions to respectively uncover 200A and cover 200B a webcam 214 on a bezel 212 of an electronic display 211. The electronic display 211 may be a part of an electronic system, such as a notebook computer, and may more specifically represent a top portion of the lid of a notebook computer of the Apple MacBook family.

The 2$^{nd}$ webcam privacy shield 220 is constructed from a thin strip of steel to form a thin, elongate member. The steel may be of any suitable thickness but may be between about 0.05 mm and 0.25 mm in some embodiments. In at least one embodiment, the steel may be blue-finished and polished 1095 spring steel between 0.100 mm and 0.130 mm thick, such as 0.004" or 0.005" stock. This is a magnetic stainless steel alloy that may be able to tolerate being bent up to a certain point, without creating a permanent bend or crease in the material. In some embodiments, the spring steel may be painted to provide an attractive appearance.

The $2^{nd}$ webcam privacy shield 220 has an overall length of about 246 mm, although other embodiments may have different lengths. The $2^{nd}$ webcam privacy shield 220 has a varying width over its length. The width of the strip at the first end is about equal to the width of the strip at the opposite end, and the width of the strip at the hole is wider than the width of the strip at the first end. In the $2^{nd}$ webcam privacy shield 220, the ends have a width of about 10 mm, and the width at the hole 222 is about 12 mm. The first end of the strip and the second end of the strip have radiused corners, which have a radius of about 5 mm in the $2^{nd}$ webcam privacy shield 220.

The $2^{nd}$ webcam privacy shield 220 includes a hole 222 cut through the strip to create a transparent portion. The hole 222 is about 16 mm long and about 9 mm wide with corners having about a 4.5 mm radius, although other embodiments may have different sized and/or shaped holes. The hole 222 is about centered in the width of the strip and is located about 108 mm from one end of the strip, and about 122 mm from the other end of the strip. Other embodiments may locate the hole at a different position on the strip.

Several members of the MacBook family include four magnets 216-219 embedded in the bezel 212 of their display 211. At least the MacBook Pro 13" Unibody, MacBook Pro 15" Unibody, MacBook Pro 17" Unibody, MacBook Pro 13" with Retina® Display, MacBook Pro 15" with Retina Display, MacBook Air 11", MacBook Air 13", the new MacBook Air 11" and the new MacBook Air 13" include the four magnets 216-219 in the same horizontal location with respect to the integrated webcam 214, although other past or future models in the Apple MacBook family may have magnets in the same or different locations, or may even remove the magnets from the bezel. Other products, such as stand-alone displays from Apple, or electronic systems from other companies, may or may not have a similar arrangement of a webcam and magnets on a bezel of a display.

The first magnet 217 may be located about 85 mm to the left of the webcam 214. The second magnet 218 may be located about 95 mm to the right of the webcam 214. The third magnet 216 may be located about 135 mm to the left of the webcam 214, and the fourth magnet 219 may be located about 135 mm to the right of the webcam 214. The vertical location of the webcam 214 may vary somewhat between MacBook models. In many MacBook models, the center of the webcam 214 is approximately at the same vertical position as the center of the magnets 216-219. But in the new MacBook Air models, the center of the webcam 214 may be about 2.5 mm lower than the center of the magnets 216-219. The thicker center section of the thin, elongate member allows for a wider hole 222, which can accommodate different vertical positions of the webcam 214. So the electronic system, which has at least one magnetic area, includes a first magnet 217 integrated into the bezel 212 of the electronic display 211 on a side of the webcam 214 opposite of a second magnet 218. The at least one magnetic area includes at least the first magnet and the second magnet.

The $2^{nd}$ webcam privacy shield 220 may be constructed as a the thin, elongate, member from a steel sheet with a hole 222 through the steel sheet. The magnetic portion and the opaque portion of the thin, elongate, member may be formed by the steel sheet. A transparent portion of the thin elongate member may be formed by the hole 222.

The $2^{nd}$ webcam privacy shield 220, or thin, elongate, member, may be slideable to an operating position 200A to place the hole 222 over the lens of the webcam 214. In the operating position 200A, the $2^{nd}$ webcam privacy shield may engage with the first magnet 217 and the second magnet 218, and the thin, elongate, member may be held in the operating position 220A by the magnetic attraction between the at least one magnetic area 217-218, and the steel of the $2^{nd}$ webcam privacy shield 220.

The $2^{nd}$ webcam privacy shield 220, or thin, elongate, member, may be slideable to shielded position 200B to place an opaque portion of the thin, elongate, member over the lens of the webcam 214. In the shielded position 200B, the $2^{nd}$ webcam privacy shield may engage with at least the first magnet 217 and the second magnet 218, and the thin, elongate, member may be held in the operating position 220A by the magnetic attraction between the at least one magnetic area 217-218, and the steel sheet. The thin, elongate, member may also engage with the third magnet 216 in the shielded position 200B. Alternatively, $2^{nd}$ webcam privacy shield 200 may be slid to the right, to cover the lens of the webcam 214 with a different opaque portion of the thin, elongate, member to create an alternative shielded position (not shown). In the alternative shielded position, the thin, elongate, member may engage with the fourth magnet 219, instead of the third magnet 216.

Figure 3A:
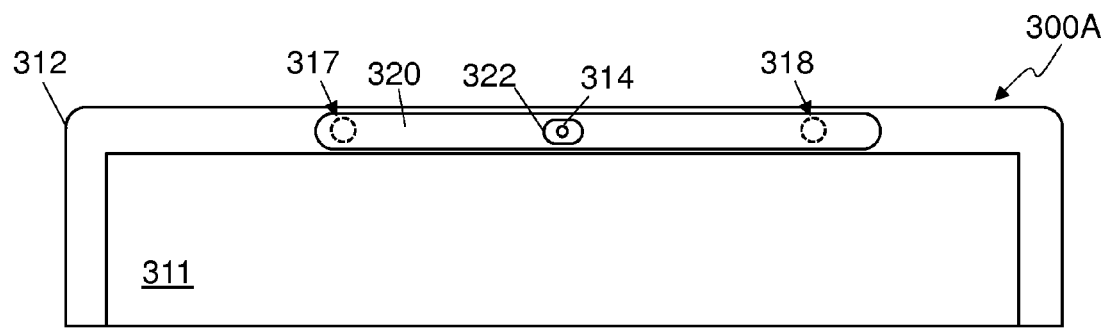
FIGS. 3A and 3B depict a third embodiment of a webcam privacy shield in positions to respectively uncover and cover a webcam on a bezel of an electronic display.
Figure 3B:
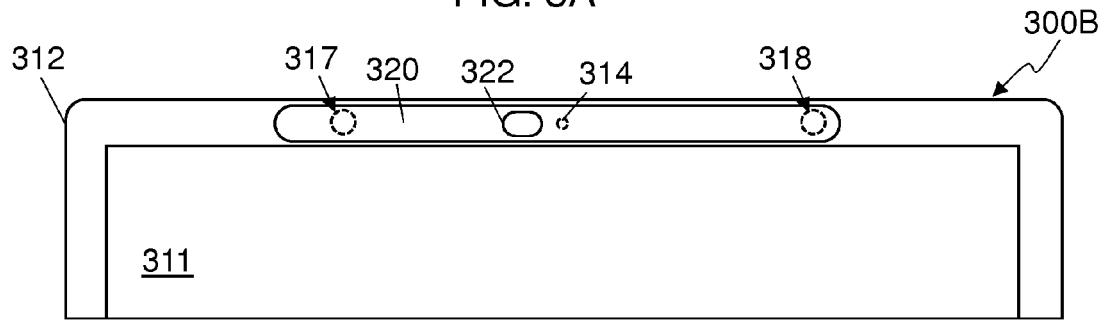

FIGS. 3A and 3B depict a third embodiment of a webcam privacy shield 320 in positions to respectively uncover 300A and cover 300B a webcam 314 on a bezel 312 of an electronic display 311. The electronic display 311 may be a part of an electronic system which may be a model in the MacBook family or may be some other electronic system. The electronic system may include a first magnet 317, and a second magnet 318, with at least one magnet on each side of the webcam 314. Some embodiments of a bezel 312 suitable for use with the $3^{rd}$ webcam privacy shield 320 may include additional magnets in the bezel 312.

The $3^{rd}$ webcam privacy shield may be constructed from a thin strip of ferromagnetic material with a hole 322. The $3^{rd}$ webcam privacy shield 320 may engage with at least two magnets 317-318 embedded in an electronic device display bezel 312. The $3^{rd}$ webcam privacy shield 320 may be similar to the $1^{st}$ webcam privacy shield 120 or $2^{nd}$ webcam privacy shield 220, but the length of the $3^{rd}$ webcam privacy shield 320 may be determined by measuring the distance from the first magnet 317 to the second magnet 318 and adding at least the length of the hole 322 to determine the length of the $3^{rd}$ webcam privacy shield 320. So if the hole is 15 mm long, and the distance from the webcam 314 to each of the two magnets 317-318 is 100 mm, the $3^{rd}$ webcam privacy shield may be determined to be at least 215 mm long.

In a shielded position 300B, the $3^{rd}$ webcam privacy shield 320 may cover the lens of the webcam 314 embedded in the electronic device display bezel 312 with an opaque portion to block light from the surrounding environment to enter the lens of the webcam 314. In the operating position 300A, the $3^{rd}$ webcam privacy shield 320 may position the hole 322 over the lens of the webcam 314 to allow light from the surrounding environment to enter the lens of the webcam 314 embedded in the electronic device display bezel 312.

The hole 322 may be formed so that the $3^{rd}$ webcam privacy shield is able to engage with both the first magnet 317 and the second magnet 318 in both the shielded position 300B and the operating position 300A. The $3^{rd}$ webcam privacy shield is slideable between the operating position 300A and the shielded position 300B.

Figure 4A:
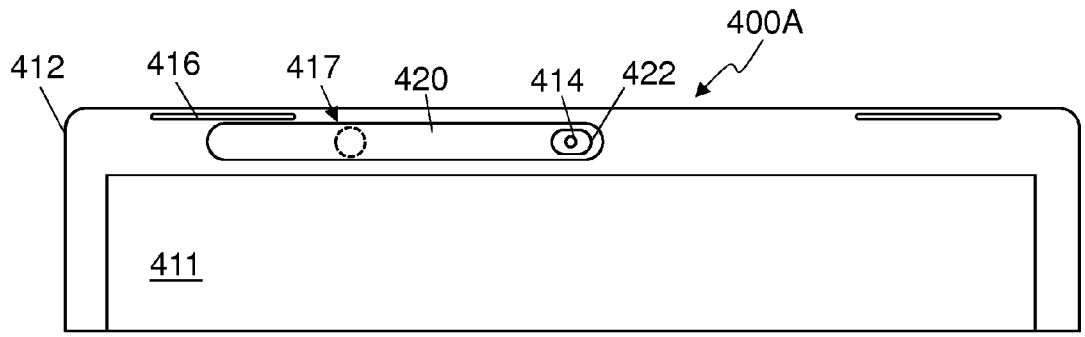
FIGS. 4A and 4B depict a fourth embodiment of a webcam privacy shield in positions to respectively uncover and cover a webcam on a bezel of an electronic display.
Figure 4B:
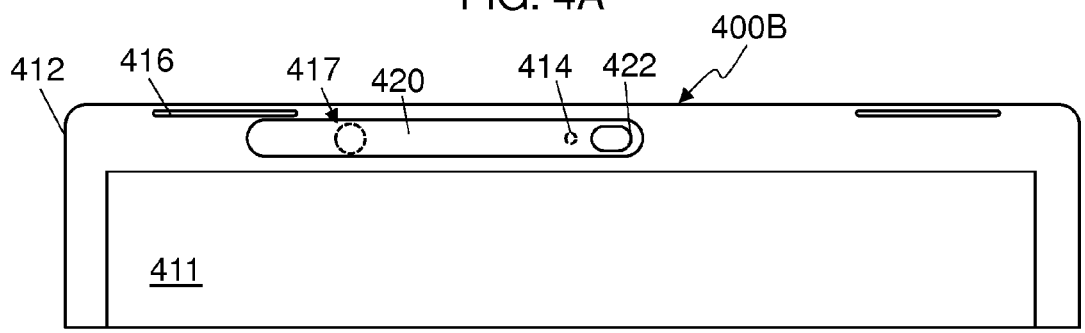

FIGS. 4A and 4B depict a fourth embodiment of a webcam privacy shield 420 in positions to respectively uncover 400A and cover 400B a webcam 414 on a bezel 412 of an electronic display 411. The electronic display 411 may be a part of an electronic system, such as a notebook computer, and includes a pad 416 with may extend from the bezel 412. The bezel 412 also includes at least one magnet 417, although other embodiments suitable for the 4$^{th}$ webcam privacy shield 420 may include additional magnets in the bezel 412.

The 4$^{th}$ webcam privacy shield 420 may selectively block light from entering a camera lens, as do the other embodiments of a webcam privacy shield described herein. The 4$^{th}$ webcam privacy shield 420 may be constructed as a thin, elongate, member from sheet steel. The sheet steel may function as an opaque portion and a magnetic portion of the thin elongate member. A hole 422 may be formed in one end of the 4$^{th}$ webcam privacy shield 420 to act as a transparent portion. If the 4$^{th}$ webcam privacy shield 420 is positioned by a magnetic attraction of the magnetic portion in the shielded position 400B, with an opaque portion over the lens of the webcam 414, the 4$^{th}$ webcam privacy shield 420 blocks light from entering the lens of the webcam 414. If the 4$^{th}$ webcam privacy shield 420 is held by a magnetic attraction of the magnetic portion in the operating position 400A, with the transparent portion over the lens of the webcam 414, the 4$^{th}$ webcam privacy shield 420 allows light to enter the lens of the webcam 414.

The 4$^{th}$ webcam privacy shield 420 may only engage with a single magnet 417 to hold the 4$^{th}$ webcam privacy shield 420 in the operating position 400A or the shielded position 400B. In some embodiments, the pad 416 may act as a brace, to keep the 4$^{th}$ webcam privacy shield 420 from rotating about the magnet 417 in the operating position 400A, and/or the shielded position 400B.

Figure 5A:
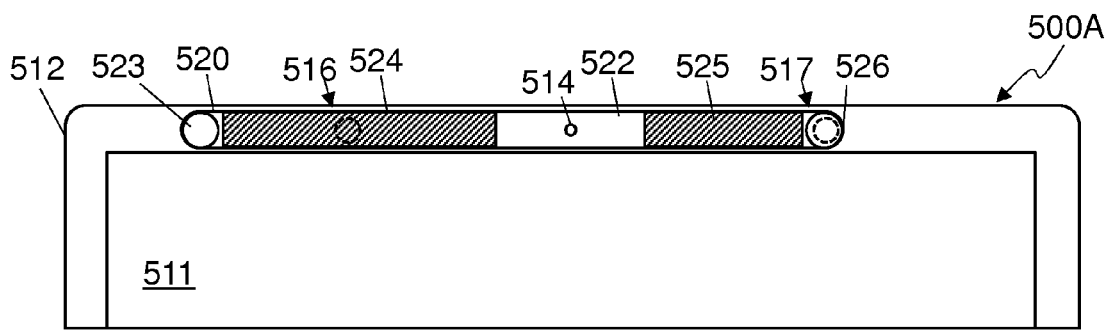
FIGS. 5A and 5B depict a fifth embodiment of a webcam privacy shield in positions to respectively uncover and cover a webcam on a bezel of an electronic display.
Figure 5B:
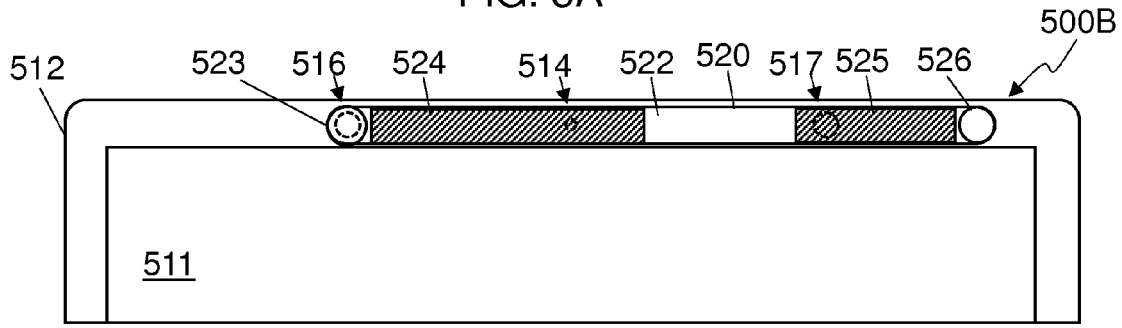

FIGS. 5A and 5B depict a fifth embodiment of a webcam privacy shield 520 in positions to respectively uncover 400A and cover a webcam 500B on a bezel 512 of an electronic display 511. The 5$^{th}$ webcam privacy shield 520 may be formed from a thin plastic strip. The 5$^{th}$ webcam privacy shield 520 may be a thin elongate member with a transparent portion 522, an opaque portion 524, and magnetic portions 523-526. Note that one or more of the magnetic portions 524, 525 may also be an opaque portion. The transparent portion 522 may be made from a transparent plastic portion of the plastic strip, although other embodiments may cut a hole to form the transparent portion 522. If the transparent plastic portion is placed over the lens of a webcam, the lens of the webcam is deemed to be uncovered, for the purposes of this disclosure and claims. In some embodiments, the opaque portion is made from an opaque coating on a portion of the plastic strip or opaque plastic. In some embodiments, the opaque portion may be at least a part of the magnetic portion.

Depending on the embodiment, a magnetic portion may be formed using a magnet or a ferromagnetic material, where the magnetic material is embedded in, or attached to, the plastic strip to form the magnetic portion. One magnetic portion may be formed using a magnet 523 attached to, or embedded in, the plastic strip of the 5$^{th}$ webcam privacy shield 520. The magnet 523 may be oriented so that it is attracted to the first magnet 516 embedded in the bezel 512. A first magnetic portion 524, and a second magnetic portion 525, which may also be opaque portions, may be formed by attaching or embedding ferromagnetic material in the plastic strip. Another magnetic portion may be formed using a magnet 526 attached to, or embedded in, the plastic strip of the 5$^{th}$ webcam privacy shield 520. The magnet 526 may be oriented so that it is attracted to the second magnet 517 embedded in the bezel 512. So in at least some embodiments, the opaque portion 524 is located between the transparent portion 522 and one magnetic portion 523, and the transparent portion 522 is located between the opaque portion 524 and another magnetic portion 526.

In the operating position 500A, the lens of the webcam 514 is behind the transparent portion 522, allowing light to enter the lens of the webcam 514 so that the webcam is able to capture images of the surrounding environment. The first magnetic portion 524 is attracted to the first magnet 516 in the bezel 512 to help hold the 5$^{th}$ webcam privacy shield 520 to the bezel 512. The magnet 526 in the 5$^{th}$ webcam privacy shield 520 may be more strongly attracted to the second magnet 517 in the bezel 512. This strong attraction may help to position the 5$^{th}$ webcam privacy shield 520 in the operating position, providing a positive feel for the user to know that the 5$^{th}$ webcam privacy shield 520 is positioned properly.

The 5$^{th}$ webcam privacy shield 520 may be slid between the operating position 500A and the shielded position 500B. In the shielded position 500B, the lens of the webcam 514 is behind the opaque portion 524, blocking light from entering the lens of the webcam 514 so that the webcam is unable to capture images of the surrounding environment. The second magnetic portion 525 is attracted to the second magnet 517 in the bezel 512 to help hold the 5$^{th}$ webcam privacy shield 520 to the bezel 512. The magnet 523 in the 5$^{th}$ webcam privacy shield 520 may be more strongly attracted to the first magnet 516 in the bezel 512. This strong attraction may help to position the 5$^{th}$ webcam privacy shield 520 in the shielded position, providing a positive feel for the user to know that the 5$^{th}$ webcam privacy shield 520 is positioned properly.

The 5$^{th}$ webcam privacy shield 520 may also be suitable for use in electronic systems where the display has a bezel with areas of ferromagnetic material on either side of the webcam. The magnets 523, 526 in the 5$^{th}$ webcam privacy shield 520 may be attracted to the ferromagnetic material to allow the 5$^{th}$ webcam privacy shield to be positioned in either an operating position to allow light to enter the lens of the webcam, or a shielded position to block light from entering the lens of the webcam.

In some embodiments of a webcam privacy shield that are similar to the 5$^{th}$ webcam privacy shield 520, the magnets 523, 526 may be omitted. Or the magnet 523 may be considered to be a part of the first magnetic portion 524 and the magnet 526 may be considered to be a part of the second magnetic portion 525. So the shielded position 500B of the thin, elongate, member on a bezel 512 of an electronic display 511 positions the opaque portion 524 over the camera lens, or lens of the webcam 514, and an operating position 500A of the thin, elongate, member on the bezel 512 positions the transparent portion 522 over the camera lens, or lens of the webcam 514. The first magnetic portion 524, engages with a first magnetic area 516 of the bezel 512 in both the shielded position 500B and operating position 500A, and the second magnetic portion 525, engages with a second magnetic area 517 of the bezel 512 in both the shielded position 500B and operating position 500A. The magnetic attraction between the first magnetic area 516 and the first magnetic portion 524, and the magnetic attraction between the second magnetic area 517 and the second magnetic portion 525 holds the thin, elongate, member statically in either the shielded position 500B or operating position 500A. The thin, elongate, member is moveable between the shielded position 500B and operating position 500A by a sliding force applied to the thin, elongate, member.

Figure 6A:
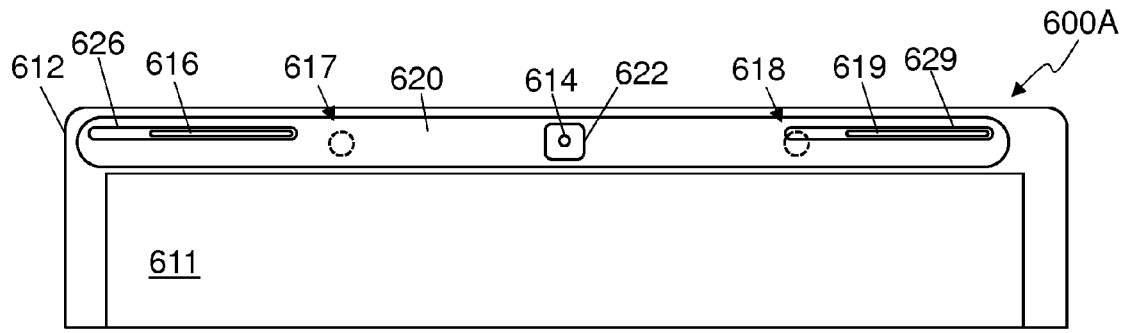
FIGS. 6A and 6B depict a sixth embodiment of a webcam privacy shield in positions to respectively uncover and cover a webcam on a bezel of an electronic display.
Figure 6B:
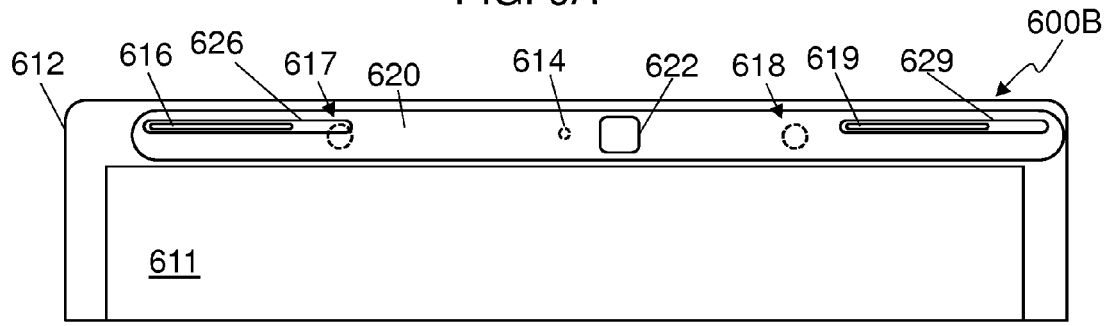

FIGS. 6A and 6B depict a sixth embodiment of a webcam privacy shield 520 in positions to respectively uncover 600A and cover 600B a webcam 614 on a bezel 612 of an electronic display 611. The bezel 612 may include one or more magnets, such as magnet 617 and magnet 618, embedded in the bezel 612. The bezel 612 may include narrow, elongate, pads 616, 619, that protrude from the bezel 612. The pads 616, 619 may provide a cushion as the display 611 is folded down over keyboard if the display 611 is a part of a notebook computer.

The $6^{th}$ webcam privacy shield 620 may be formed from a thin piece of ferromagnetic material. A hole 622 may be formed to create a transparent portion of the $6^{th}$ webcam privacy shield 620. A first slot 626, and a second slot 629, may also be formed in the $6^{th}$ webcam privacy shield 620. The first slot 626 is configured to fit over the first pad 616 and the second slot 629 is configured to fit over the second pad 619. The magnetic attraction between the magnets 617, 618 and the ferromagnetic material of the $6^{th}$ webcam privacy shield 620 may hold the $6^{th}$ webcam privacy shield 620 in place until a sliding force is applied to $6^{th}$ webcam privacy shield 620.

In the operating position 600A, the hole 622 is positioned over the lens of the webcam 614 to allow the webcam 614 to capture images of the surrounding environment. The first slot 626 is positioned so that the first pad 616 is toward one end of the first slot 626, such as the right end as shown, in the operating position 600A, and the second slot 629 is positioned so that the second pad 619 is toward one end of the second slot 626, such as the right end as shown, in the operating position 600A.

If a sliding force to is applied to the $6^{th}$ webcam privacy shield 620 to slide the $6^{th}$ webcam privacy shield 620 to the right, the pads 616, 619 may act as guides for the slots 626, 629 to help keep the $6^{th}$ webcam privacy shield 620 in position until the pads 616, 619 hit the left end of the slots 626, 629, indicating to the user that the $6^{th}$ webcam privacy shield 620 is in the shielded position 600B, with an opaque portion covering the lens of the webcam 614. If a sliding force to is subsequently applied to the $6^{th}$ webcam privacy shield 620 to slide $6^{th}$ webcam privacy shield 620 to back to the left, the pads 616, 619 may act as guides for the slots 626, 629 to help keep the $6^{th}$ webcam privacy shield 620 in position until the pads 616, 619 hit the right end of the slots 626, 629, indicating to the user that the $6^{th}$ webcam privacy shield 620 is back in the operating position 600A, with the transparent portion exposing the lens of the webcam 614.

Figure 7A:
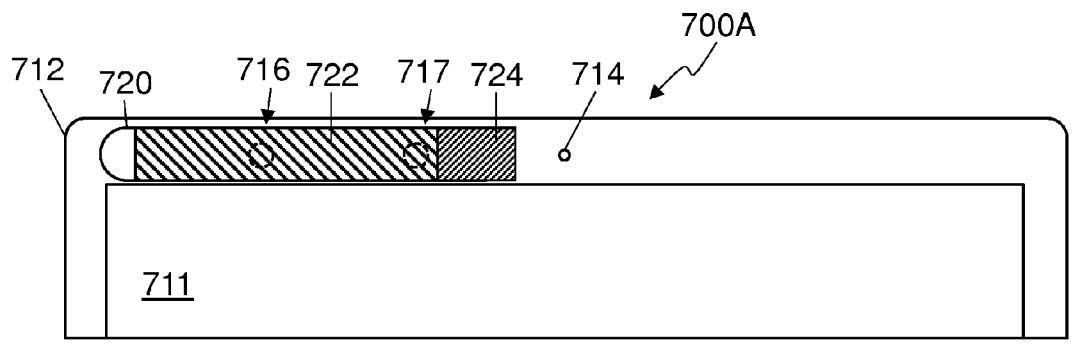
FIGS. 7A and 7B depict a seventh embodiment of a webcam privacy shield in positions to respectively uncover and cover a webcam on a bezel of an electronic display.
Figure 7B:
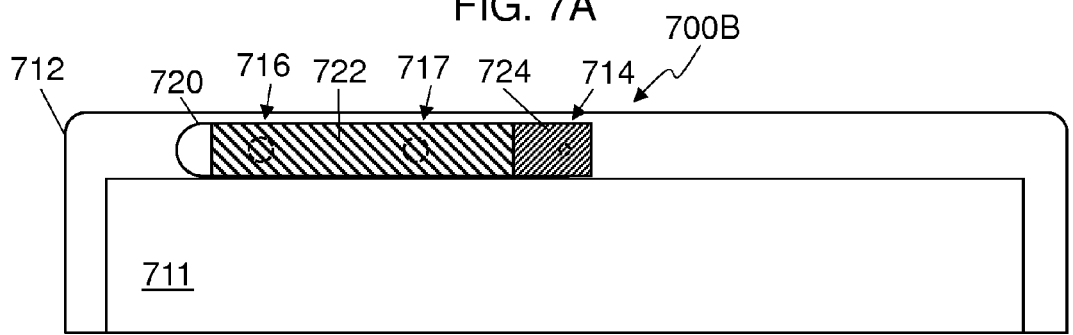

FIGS. 7A and 7B depict a seventh embodiment of a webcam privacy 720 shield in positions to respectively uncover 700A and cover a webcam 714 on a bezel 712 of an electronic display 711. The bezel 712 may also include at least one magnetic area, which may be formed by embedding magnetic material in the bezel 712, such as a first magnet 716 and a second magnet 717.

The $7^{th}$ webcam privacy shield 720 may be an apparatus to selectively block light from entering a camera lens, such as the lens of the webcam 714. The $7^{th}$ webcam privacy shield 720 may be formed as a thin, elongate, member that includes an opaque portion 724, and a magnetic portion 722. In the operating position 700A, the $7^{th}$ webcam privacy shield 720 is positioned so that the lens of the webcam 714 is not covered, allowing the webcam 714 to operate normally. If the $7^{th}$ webcam privacy shield 720 is slid to the right, into the shielded position 700B, the opaque portion 724 is held over a camera lens by a magnetic attraction of the magnetic portion 722, where the camera lens is the lens of the webcam 714. In the shielded position 700B, the opaque portion 724 blocks light from entering the camera lens. The magnetic attraction between the magnetic portion 722 and at least one of the magnets 716, 717 may hold the $7^{th}$ webcam privacy shield 720 statically in either the operating position 700A or the shielded position 700B, until a sliding force is applied to the $7^{th}$ webcam privacy shield 720 to change its position.

In some embodiments, such as for certain products in the MacBook family, the first magnet 716 may be positioned about 135 mm to one side of the webcam 714 and the second magnet 717 may be positioned about 85 mm or about 95 mm from the webcam 714 on the same side as the first magnet 716. In such an embodiment, the $7^{th}$ webcam privacy shield 720 may be at least about 90 mm long to allow a magnetic portion 722 of the $7^{th}$ webcam privacy shield 720 to engage with the second magnet 717 and still allow the opaque portion 724 to cover the lens of the webcam 714. Other embodiments of the $7^{th}$ webcam privacy shield 720 may be at least 140 mm long to allow the magnetic portion 722 to engage with both the first magnet 716 and the second magnet 717 with the opaque portion 724 covering the lends of the webcam 714.

Figure 8:
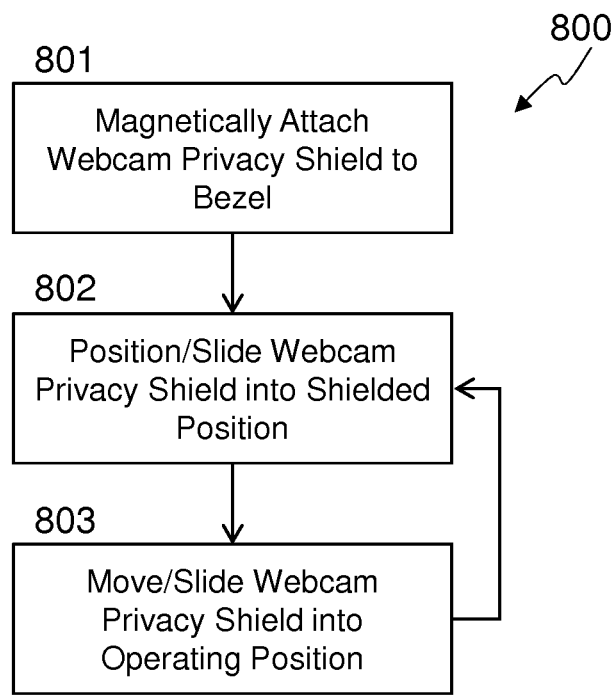
FIG. 8 is a flowchart of a method to provide privacy from a webcam.

FIG. 8 is a flowchart 800 of a method to provide privacy from a webcam. The flowchart begins with block 801, where a webcam privacy shield is attached to a bezel of an electronic display using magnetic attraction between the bezel and the webcam privacy shield. The bezel of the electronic display includes an integrated webcam. The webcam privacy shield may be any of the embodiments described herein, or any other suitable embodiment of a webcam privacy shield.

At block 802 an opaque portion of the webcam privacy shield is positioned over a lens of the webcam to prevent light from entering the lens of the webcam. If the opaque portion of the webcam privacy shield is positioned over the lens of the webcam to prevent light from entering the lens of the webcam, the webcam privacy shield is in the shielded position. The positioning may be accomplished by sliding the webcam privacy shield over the bezel in some embodiments.

At block 803, the opaque portion of the webcam privacy shield is moved to uncover the lens of the webcam and allow light to enter the lens of the webcam. If the opaque portion of the webcam privacy shield is not covering the lens of the webcam, or if a transparent portion of the webcam privacy shield is positioned over the lens of the webcam to allow light to enter the lens of the webcam, the webcam privacy shield is in the operating position. The moving may be accomplished by sliding the webcam privacy shield over the bezel in some embodiments.

Depending on the desire of a user, the webcam privacy shield may include sliding the webcam privacy shield between the shielded position and the operating position, any number of times by traversing between block 802 and block 803. The webcam privacy shield is held to the bezel of the electronic display by the magnetic attraction between the bezel and the webcam privacy shield in both the shielded position and the operating position.

Figure 9:
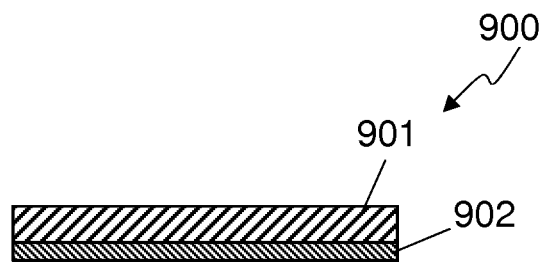
FIG. 9 is a cross-sectional view of an embodiment of a webcam privacy shield.

FIG. 9 is a cross-sectional view of an embodiment of a webcam privacy shield 900. The webcam privacy shield 900 includes a base material 901. The base material 901 may be any type of material, depending on the embodiment, but may be steel in at least one embodiment, and may be plastic in at least one other embodiment. Depending on the embodiment, the base material 901 may have a coating or other material on one side and/or the other, such as paint, magnetic material, opaque material, stickers showing a brand name or logo, or other material, although such a coating or other material is not shown in FIG. 9.

The exposed side of the base material 901 may be positioned away from a bezel of an electronic display and may be visible to a user. The other side, or back side, of the base material 901 is positioned against the bezel of a display while in use and may not be visible to a user once it is positioned for use. A non-scratch material 902 may be adhered to one or more portions of a back side of the base material 901. Depending on the embodiment, the non-scratch material 902 may be made of a polymeric material such as vinyl, DuPont™ Teflon®, or other plastic, paper, fabric, foam, a conformal coating, paint, or any other type of material that may reduce the likelihood of the webcam privacy shield 900 scratching the bezel of the electronic display as the webcam privacy shield 900 is slid across the bezel between the operating and shielded positions. In some embodiments, the non-scratch material 902 may also reduce friction as the webcam privacy shield is slid.

The non-scratch material 902 may be of any thickness less than about 1 mm but may be less than 0.25 mm in some embodiments, and even thinner in other embodiments. In some embodiments, the non-scratch material 902 may cover most or all of the back side of the webcam privacy shield 900, but other embodiments may use one or more smaller sections of non-scratch material 902 adhered to the back side of the base material 901.

In some embodiments, the non-scratch material 902 may be printed with instructions for using the webcam privacy shield 900, or other product information. Thus, the non-scratch material 902 may have multiple uses, including one or more of reducing scratching, reducing sliding friction, and providing the user with information.

As used in this specification and the appended claims, the singular forms "a", "an", and "the" include plural referents unless the content clearly dictates otherwise. Thus, for example, reference to an element described as "a device" may refer to a single device, two devices or any other number of devices. As used in this specification and the appended claims, the term "or" is generally employed in its sense including "and/or" unless the content clearly dictates otherwise.

Unless otherwise indicated, all numbers expressing quantities of elements, dimensions, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the present description. At the very least, and not as an attempt to limit the application of the doctrine of equivalents to the scope of the claims, each numerical parameter should at least be construed in light of the number of reported significant digits and by applying ordinary rounding techniques. All numerical ranges provided herein, including in the claims, are inclusive unless otherwise noted, such that the numerical limits provided for the range are included in the range, as well as all numbers subsumed with that range. So for example, a range of between 0.05 mm and 0.30 mm includes 0.05 mm, 0.2 mm, 0.234567 mm, and 0.30 mm.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6.

The description of the various embodiments provided above is illustrative in nature and is not intended to limit the invention, its application, or uses. Thus, variations that do not depart from the gist of the disclosure are intended to be within the scope of the embodiments of the present disclosure. Such variations are not to be regarded as a departure from the intended scope of the present disclosure.

We claim:

1. A webcam privacy shield comprising:
   a strip of opaque magnetic material having a hole through the strip, the strip attachable to an electronic device display bezel as the webcam privacy shield;
   wherein the strip is no wider than 40 mm, no longer than 400 mm, and no thicker than 1 mm; and
   wherein the hole is at least 10 square mm in size and is located no closer than 70 mm from either end of the strip.

2. The webcam privacy shield of claim 1, wherein the opaque magnetic material comprises steel;
   wherein the strip is between 180 mm and 300 mm long, between 8 and 20 mm wide, and between 0.05 mm and 0.30 mm thick; and
   wherein the hole is between 5 mm and 15 mm wide and between 5 mm and 25 mm long, and a first end of the hole is located at least 80 mm from a first end of the strip and an opposite end of the hole is located at least 90 mm from an opposite end of the strip.

3. The webcam privacy shield of claim 1, wherein the opaque magnetic material comprises stainless steel;
   wherein the strip is between 230 mm and 280 mm long, between 9 and 15 mm wide, and between 0.10 mm and 0.25 mm thick; and
   wherein the hole is at least 6 mm wide but no wider than 2 mm less than a maximum width of the strip, between 10 mm and 20 mm long, and the hole is located no closer than 100 mm from either end of the strip.

4. The webcam privacy shield of claim 3, wherein a width of the strip at a first end is equal to a width of the strip at an opposite end, and a width of the strip at the hole is wider than the width of the strip at the first end;
   wherein the first end of the strip and the second end of the strip have radiused corners.

5. The webcam privacy shield of claim 1, wherein the webcam privacy shield is configured to:
   in a first position, cover a lens of a webcam embedded in the electronic device display bezel to block light from a surrounding environment to enter the lens of the webcam;
   in a second position, allow the light from the surrounding environment to enter the lens of the webcam; and
   engage with at least two magnets embedded in the electronic device display bezel in both the first position and the second position;
   wherein the webcam privacy shield is slideable between the first position and the second position.

6. The webcam privacy shield of claim 1, further comprising:
   non-scratch material adhered to one or more portions of a back side of the strip of opaque magnetic material.

7. An apparatus to selectively block light from entering a camera lens, the apparatus comprising:

a thin, elongate, member comprising an opaque portion, a transparent portion, a first magnetic portion, and a second magnetic portion, the opaque portion located between the transparent portion and the first magnetic portion, and the transparent portion located between the opaque portion and the second magnetic portion;

wherein the opaque portion, if held over a camera lens by a magnetic attraction of at least one of the first magnetic portion and the second magnetic portion, blocks light from entering the camera lens; and wherein the transparent portion, if held over the camera lens by the magnetic attraction of at least one of the first magnetic portion and the second magnetic portion, allows light to enter the camera lens.

8. The apparatus of claim 7, further comprising:
non-scratch material adhered to one or more portions of a back side of the thin, elongate, member.

9. The apparatus of claim 7, wherein the opaque portion and the first magnetic portion comprise an opaque magnetic material, and the transparent portion comprises a hole in the thin, elongate, member.

10. The apparatus of claim 9, wherein the opaque magnetic material comprises steel.

11. The apparatus of claim 7, wherein the thin, elongate, member comprises a plastic strip, and the transparent portion comprises a transparent plastic portion of the plastic strip.

12. The apparatus of claim 11, wherein the opaque portion comprises an opaque coating on a portion of the plastic strip or opaque plastic.

13. The apparatus of claim 11, wherein the first magnetic portion comprises a magnet or a ferromagnetic material coupled to the plastic strip.

14. The apparatus of claim 13, wherein the opaque portion comprises at least a part of the first magnetic portion.

15. The apparatus of claim 7, wherein a first position of the thin, elongate, member on a bezel of an electronic display positions the opaque portion over the camera lens, and a second position of the thin, elongate, member on the bezel positions the transparent portion over the camera lens;
wherein the first magnetic portion engages with a first magnetic area of the bezel in both the first and second position;
wherein the second magnetic portion engages with a second magnetic area of the bezel in both the first and second position; and
wherein the magnetic attraction between the first magnetic area and the first magnetic portion, and the magnetic attraction between the second magnetic area and the second magnetic portion holds the thin, elongate, member statically in either the first position or the second position; and
wherein the thin, elongate, member is moveable between the first position and second position by a sliding force applied to the thin, elongate, member.

16. An electronic system comprising:
an electronic display comprising:
a webcam integrated into a bezel of the electronic display; and
a first magnet and a second magnet integrated into the bezel of the electronic display on opposite sides of the webcam;
a thin, elongate, member comprising a steel sheet and having a first magnetic portion, an opaque portion, a hole through the steel sheet, and a second magnetic portion, the thin elongate member held on the bezel by a magnetic attraction between the first magnet integrated into the bezel and the first magnetic portion of the thin elongate member, and between the second magnet integrated into the bezel and the second magnetic portion of the thin elongate member;
wherein the thin, elongate, member is slideable between a shielded position, with the opaque portion positioned over a lens of the webcam, and an operating position, with the hole positioned over the lens of the webcam.

17. The electronic system of claim 16, further comprising:
a base unit comprising a keyboard;
wherein the electronic display is hingedly coupled to the base unit to fold over the keyboard; and
wherein the thin, elongate, member is thin enough to fully close the electronic display over the keyboard with the thin, elongate, member in the shielded position.

18. A method to provide privacy from a webcam, the method comprising:
attaching a webcam privacy shield to a bezel of an electronic display using a first magnetic attraction between a first portion of the bezel and a first portion of the webcam privacy shield, and a second magnetic attraction between a second portion of the bezel and a second portion of the webcam privacy shield, wherein the bezel comprises the webcam;
positioning an opaque portion of the webcam privacy shield over a lens of the webcam to prevent light from entering the lens of the webcam; and
sliding the webcam privacy shield between a shielded position and an operating position;
wherein the shielded position of the webcam privacy shield positions the opaque portion of the webcam privacy shield over the lens of the webcam to prevent light from entering the lens of the webcam, and the operating position of the webcam privacy shield positions a transparent portion of the webcam privacy shield over the lens of the webcam to allow light to enter the lens of the webcam; and
wherein the webcam privacy shield is held to the bezel of the electronic display by the first magnetic attraction between the first portion of the bezel and the first portion of the webcam privacy shield, and the second magnetic attraction between the second portion of the bezel and the second portion of the webcam privacy shield, in both the shielded position and the operating position.

19. The method of claim 18, further comprising:
moving the opaque portion of the webcam privacy shield to uncover the lens of the webcam and allow light to enter the lens of the webcam.

\* \* \* \* \*